Patented Dec. 29, 1936

2,065,593

UNITED STATES PATENT OFFICE 2,065,593

WATER-SOLUBLE DIAZOIMINO COMPOUNDS AND THEIR PRODUCTION

Herbert A. Lubs, Wilmington, Del., assignor to E. I. du Pont de Nemours & Company, Wilmington, Del., a corporation of Delaware No Drawing. Application September 18, 1934, Serial No. 744,536

2 Claims. (Cl. 260—69)

This invention relates to new compositions of matter which have particular utility in the field of azo dyes. More particularly the invention relates to agents capable of stabilizing diazotized primary arylamines against reaction with typical coupling components in a basic medium, and to the stabilized compositions of matter which result from coupling these agents to a said diazotized amine. The invention will be described with particular reference to the use of the new compounds in stabilizing the azo components of dyestuffs, and in its relation to the methods of stabilizing such components, but it is to be understood that this description is intended to be exemplary, not limitative.

The prior art discloses within the field of azo dyestuffs a class which are called "developed" or "ingrain" azo dyes. Dyeing with developed dyes is accomplished by affixing to the material to be dyed either the azo or the coupling component, thereafter immersing the material in a solution containing the other component, whereby the reaction completing the dye takes place on the material. A particular method of applying such dyes is to stabilize one component against reaction with the other, to pad the material with a mixture containing them, and to complete the dye and the dyeing simultaneously by permitting the components to couple and dyeing to take place. In one method of application the azo component, a diazotized arylamine, is coupled to a stabilizing agent, such as piperidine-alpha-carboxylic-acid, and is incorporated in a paste with the coupling component and enough of a base to prevent the stabilized diazo compound from breaking up and coupling with the coupling component. The paste is applied to the material-to-be-dyed, e. g. a fabric, and the dye is produced by subjecting the impregnated fabric to the action of a weak acid. This process is much used in the dyeing of goods by printing.

It is an object of the invention to prepare new agents capable of stabilizing a diazotized arylamine against reaction in neutral or alkaline solution with coupling components. Another object of the invention is to produce azo components stabilized, in neutral or basic solution, against reaction with coupling components capable of forming, with the azo component, an azo dyestuff. Another object of the invention is a method of stabilizing azo components against reaction in neutral or basic solution with a coupling component. Another object of the invention is to produce new compositions of matter. Other objects of the invention will be in part apparent and in part hereinafter more fully set forth.

The objects of the invention are accomplished, generally speaking, by coupling a diazotized primary arylamine which contains no sulfonic or carboxylic acid, or other water-solubilizing groups, but which may, and preferably does, have substituents such as alkoxy, alkyl, and halogen, through the diazo group to the nitrogen of ac-alkyl-amino-tetrahydro-naphthalene-ar-sulfonic acid having less than three sulfonic acid groups. Other objects of the invention are attained by making any of the various compounds which are within the scope of this invention.

The new stabilizing compounds may be made by reacting a partially reduced naphthylamine with sulfuric acid under conditions which are favorable to substitution, in the unreduced portion of the ring, of sulfonic acid groups, or they may be made by any other satisfactory method. Illustrative methods of preparing these compounds are as follows:

Example I

*Ac-beta-(ethyl-amino)-tetrahydro-naphthalene-ar-sulfonic acid.*

17.5 parts of ethyl-ac-tetrahydro-beta-naphthylamine are slowly added to 85.0 parts of monohydrate sulfuric acid with vigorous stirring and external cooling. The mixture is then heated at 90–5° C. for 18–20 hours. After cooling, the sulfonation mass is poured on ice, when white crystals of the naphthylamine monosulfonic acid slowly separate. These are filtered off and washed with a little ice water. Purification may be effected by dissolving in a little dilute sodium hydroxide solution, clarifying, and reprecipitating with hydrochloric acid.

Example II

*Ac-alpha-(ethyl-amino)-tetrahydro-naphthalene-ar-sulfonic acid.*

17.5 parts of ethyl-ac-tetrahydro-alpha-naphthylamine are monosulfonated as in Example I. After cooling, the solution is poured on ice, treated with an excess of calcium carbonate and 10.6 parts of sodium carbonate. The hot mixture is filtered hot and the press-cake carefully washed with hot water. On evaporation of the filtrate, the sodium salt of ethyl-ac-tetrahydro-alpha-naphthylamine-sulfonic acid is obtained.

Example III

*Ac-alpha-(ethyl-amino)-tetrahydro-naphthalene-ar-disulfonic acid*

17.5 parts of ethyl-ac-tetrahydro-alpha-naphthylamine are monosulfonated as in Example I. The reaction mixture is cooled, 30 parts of 65% oleum added, and the temperature raised to 125–130° C. for 24 hours. After cooling, the solution is poured on ice and treated with an excess of calcium carbonate and 10.6 parts of sodium carbonate. The hot mixture is filtered and the press-cake carefully washed with hot water. On evaporation of the filtrate the sodium salt of ac-alpha-(ethyl-amino)-tetrahydro-naphthalene-ar-disulfonic acid is obtained.

The examples above disclose partially reduced naphthylamine sulfonic acids substituted in either the alpha or the beta position by ethyl-substituted amino groups. In place of the ethyl group, methyl, propyl, butyl, and other alkyl groups may be used. The sulfonic acid groups are substituted in the unreduced portion of the naphthalene nucleus, and either one or two of them may be present. The sulfonic group or groups may lie in the alpha, the beta, or one in each of these positions. The new compounds are themselves soluble in water and, when coupled to insoluble azo components, lend solubility thereto.

In preparing the new stable compounds an aromatic primary amine which contains no group which will tend to make it water-soluble, that is no carboxyl or sulfonic group, is diazotized in the usual manner. Exemplary of the large number of aromatic primary amines available for diazotization and coupling with the various partially-reduced naphthylamine sulfonic acids, elsewhere herein described, are the following: ortho-chloraniline, meta-chloraniline, meta-nitraniline, 4-chloro-2-nitraniline, 4-chloro-2-amino-anisole, 5-nitro-2-amino-anisole, 1-amino-4-benzoylamino-2,5-diethoxy-benzene, N-(para-amino-benzoyl)-aniline, dianisidine, alpha-amino-anthraquinone, 2-nitro-4-methyl-benzene-azo-cresidine, 3-amino-carbazole, alpha-naphthylamine, 4,4'-diamino-diphenylamine. These examples are given to indicate that the aryl nucleus in these compounds is not limited to benzene or naphthalene. In fact, any aromatic primary amine of the benzene, azo-benzene, diphenyl, naphthalene, anthraquinone, or carbazole series may be used, and these aryl nuclei may have as substituents in addition to the amino group alkyl, alkoxy, halogen, nitro, and benzoylamino.

The solution of the diazo salt thus obtained is mixed with a solution containing an ac-alkyl-amino-tetrahydro-naphthalene-ar-sulfonic acid. The reaction is usually effected in a water solution of mild acidity, neutrality, or alkalinity and in the presence of an acid binding agent, such as sodium acetate, sodium bicarbonate, or sodium carbonate which react to form the sodium salt of the sulfonic acid product. The reaction proceeds as follows:

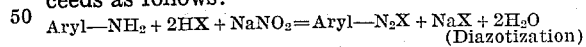

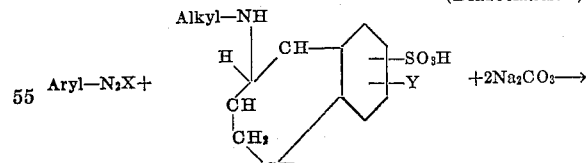

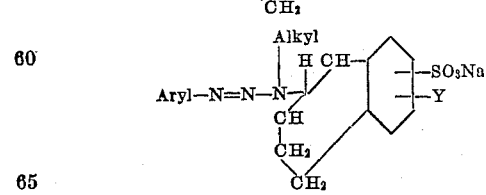

Y is either hydrogen or a sulfonic acid group. X is an anion, such as chloride or sulfate.

The following examples are preferred methods of producing the new stable diazo compounds, but it is to be understood that they are exemplary, not limitative. All quantities are stated throughout the specification in parts by weight.

*Example IV*

15.75 parts of 4-chloro-2-amino-anisole are diazotized by warming with 60 parts of water containing 30 parts of hydrochloric acid at 20° Bé., cooling, and adding in sequence about 60 parts of ice, and 7 parts of sodium nitrite in 30 parts of water. When the diazotization is complete, the solution is filtered.

25.5 parts of ac-beta (ethyl-amino)-tetrahydro-naphthalene-ar-sulfonic acid are dissolved in 200–300 parts of water containing just enough sodium hydroxide to convert the acid to the soluble sodium salt. 15 parts of sodium carbonate are added to facilitate the reaction, and the solution is mixed with the solution of diazotized 4-chloro-2-amino-anisole, the temperature being maintained at about 10° C. by external cooling. More sodium carbonate may be added, if necessary, to maintain an alkaline reaction to brilliant yellow papers. When addition of the diazo-solution is complete, tests for free diazo-salt by "spotting" with a coupling agent give negative results, indicating that the following reaction has taken place:

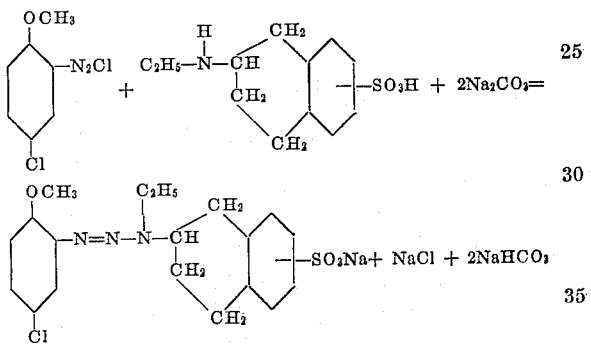

This diazoimino-compound may be completely precipitated as an oily product by adding salt to the solution; the product may be dried, preferably in vacuo at 70–80° C.

This new diazoimino-compound is a light colored, stable solid of fair solubility in water. It is very stable toward the action of cold alkalies, and is not readily hydrolyzed by cold dilute solutions of weak acids. However, when heated with dilute acids it is hydrolyzed to the diazo-salt and ac-beta-(ethyl-amino)-tetrahydro-naphthalene-ar-sulfonic acid.

Equivalent amounts of other arylamines such as 4-nitro-2-amino-anisole, 2,5-dichloraniline, 4-chloro-2-amino-toluene, m-nitraniline, (etc., as herein described) may be substituted for 4-chloro-2-amino-anisole in the above procedure.

*Example V*

15.75 parts of 4-chloro-2-amino-anisole are diazotized and condensed with 25.5 parts of the sulfonic acid described in Example II, under the same conditions as in Example IV. The reaction may be represented by the following equation:

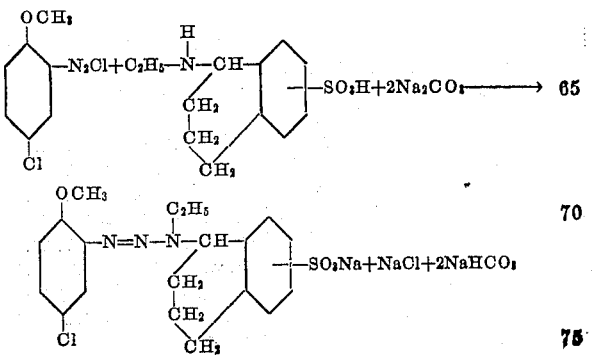

This diazoimino-compound is similar to that of Example IV in its properties. Equivalent quantities of other aromatic amines may be substituted in preparing the diazo-solution.

*Example VI*

15.75 parts of 4-chloro-2-amino-anisole are diazotized and condensed with 33.5 parts (as free acid) of the disulfonic acid of Example III under the same conditions as in Example IV. The reaction is represented by the following equation:

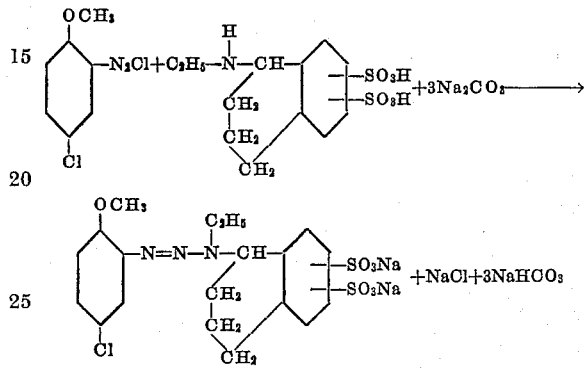

This diazoimino compound is very soluble in water, and is best isolated by evaporating the solution to dryness, preferably under reduced pressure at 40° C. It is obtained as a light colored solid, mixed with by-product inorganic salts. The product may be extracted from these impurities by warming with ethyl alcohol in which the inorganic salts are insoluble. The filtered alcoholic solution is again evaporated to dryness to recover the product.

The properties of the above substance are very similar to the product obtained in Example IV, but it exhibits a much greater solubility in water.

It is to be noted that the solubility of the products of this new series will vary somewhat in accordance with change in chemical constitution. However, all the products will exhibit a degree of solubility in water and/or alkalies which will render them useful in the dyeing and printing art.

It will also be understood that the processes for the preparation of the new products are susceptible of wide variations. The conditions for the diazotization of aromatic amines are subject to considerable variation, as is well known; and the coupling of the diazo-salts with the tetrahydro-naphthylamine derivatives may be carried out in various ways. For example, various alkalies or "buffers" have been found suitable for neutralization of the diazo-salt and for effecting the coupling reaction. Under proper conditions, it is possible to use sodium hydroxide, sodium carbonate, sodium bicarbonate, sodium acetate, and so forth for this purpose. Further, the isolation of the product may be effected by various procedures. Sometimes the products are so soluble that evaporation to dryness is the best method of securing the material in a dry form. Nevertheless, many members of the series are precipitated by the addition of "salting" agents such as sodium chloride and sodium sulfate. Likewise, when it is desirable to remove inorganic salts, procedures other than extraction with alcohol may be followed without departing from the spirit of the invention.

The stability of the new diazoimino compounds toward the action of alkalies and acids will vary in degree. In general, the new products are not affected by fairly strong alkalies, and are very slowly or not at all hydrolyzed by dilute weak acids at ordinary temperatures. However, all of them will show the characteristic hydrolysis with hot dilute acids which make them useful in dyeing and printing compositions, but the concentration of acid and the temperature at which rapid hydrolysis occurs will vary somewhat in relation to the nature of the individual compound.

Among the advantages of the invention are the preparation of new compositions of matter useful in the stabilization of components useful in the preparation of developed azo dyes. Another advantage is the preparation of new water-soluble, stable compounds useful in the manufacture of dyestuffs. Another advantage of the invention is a method for stabilizing compounds useful for the manufacture of dyestuffs. Other advantages of the invention will be apparent to those skilled in the art.

As many apparently widely different embodiments of this invention may be made without departing from the spirit and scope thereof, it is to be understood that I do not limit myself to the specific embodiments thereof except as defined in the appended claims.

I claim:

1. The product resulting from coupling diazotized 3-chlor-6-methoxy-aniline to the nitrogen of ac-beta-(ethyl-amino)-tetrahydro-naphthalene-ar-monosulfonic acid.

2. The process which comprises coupling diazotized 3-chlor-6-methoxy-aniline to the nitrogen of ac-beta-(ethyl-amino)-tetrahydro-naphthalene-ar-monosulfonic acid.

HERBERT A. LUBS.